United States Patent [19]

Gaylord et al.

[11] 4,242,482

[45] Dec. 30, 1980

[54] PEROXYGEN COMPOUND-METAL MERCAPTIDE REDOX CATALYST SYSTEM FOR VINYL HALIDE POLYMERIZATION

[75] Inventors: Norman G. Gaylord, New Providence; Meshulam Nagler, Irvington; Marvin M. Fein, Westfield, all of N.J.

[73] Assignee: Dart Industries Inc., Los Angeles, Calif.

[21] Appl. No.: 106,331

[22] Filed: Dec. 21, 1979

[51] Int. Cl.³ .............................. C08F 4/40; C08F 4/32; C08F 4/34; C08F 4/58
[52] U.S. Cl. .................................... 526/192; 526/224; 526/344
[58] Field of Search .................. 526/192, 224, 344

[56] References Cited

U.S. PATENT DOCUMENTS

| | | | |
|---|---|---|---|
| 3,639,370 | 2/1972 | Edl et al. | 526/192 |
| 3,668,194 | 6/1972 | Shen | 526/192 |
| 3,970,612 | 7/1976 | Witschard et al. | 526/192 |
| 4,091,197 | 5/1978 | Fischer et al. | 526/192 |

FOREIGN PATENT DOCUMENTS

| | | | |
|---|---|---|---|
| 917333 | 2/1963 | United Kingdom | 526/192 |
| 938068 | 9/1963 | United Kingdom | 526/192 |

*Primary Examiner*—William F. Hamrock
*Attorney, Agent, or Firm*—Bryant W. Brennan; Harold R. Beck

[57] ABSTRACT

A process for the bulk or suspension polymerization of vinyl chloride or vinylidene chloride, in the presence of a redox catalyst system consisting of a peroxyester or a diacyl peroxide and a stannous or antimony (III) mercaptide.

15 Claims, No Drawings

PEROXYGEN COMPOUND-METAL MERCAPTIDE REDOX CATALYST SYSTEM FOR VINYL HALIDE POLYMERIZATION

FIELD OF THE INVENTION

This invention relates to a process for the polymerization of various ethylenically unsaturated monomers, particularly vinyl chloride, in bulk or suspension systems, using a redox catalyst system consisting of a peroxyester or a diacyl peroxide and a stannous or antimony (III) mercaptide.

BACKGROUND OF THE INVENTION

The suspension polymerization of vinyl chloride is generally carried out at temperatures below 70° C. using organic soluble initiators. Although lauroyl peroxide was earlier the most widely used catalyst, in recent years other low temperature catalysts including azobisisobutyronitrile, diisopropyl peroxydicarbonate, t-butyl peroxypivalate and mixtures thereof, have been adopted. These and other catalysts are described in Pennwalt Corporation, Lucidol Division, Technical Bulletin 30.90, "Free Radical Initiators for the Suspension Polymerization of Vinyl Chloride" (1977).

The choice of initiator is dictated by its half-life and by its influence on the polymerization process and the properties of the poly(vinyl chloride) produced thereby.

The polymerization of vinyl chloride is characterized by a short induction period, followed by a gradually increasing rate of polymerization. During the earlier stages of the polymerization, the reaction rate is lower than the maximum so that the capacity of the reactor is not fully utilized. Peroxyesters reduce the induction period and, due to a more constant rate of polymerization, increase reactor productivity. Further, peroxyesters can generally be used at levels below that needed for peroxides and give much less chain branching during polymerization.

Although peroxyesters such as diisopropyl peroxydicarbonate and t-butyl peroxypivalate offer numerous advantages in vinyl chloride polymerization, their disadvantages include the necessity for low temperature shipping and storage and decreased efficiency at elevated temperatures.

The use of peroxyesters having higher decomposition temperatures is not feasible in present poly(vinyl chloride) production facilities due to the higher monomer pressures involved and the low molecular weight and poorer stability of the resultant resins. Nevertheless, the handling advantages of such peroxyesters makes their use extremely attractive.

The use of higher temperature catalysts at lower temperatures is a common practice in polymer technology. Thus, redox systems such as ammonium persulfate-sodium metabisulfite and hydrogen peroxide-ferrous sulfate are used in emulsion polymerization while benzoyl peroxide-dimethylaniline and methyl ethyl ketone peroxide-cobalt naphthenate are used in styrene-unsaturated polyester polymerization.

Reducing agents used in conjunction with monomer-soluble peroxyesters in the polymerization of vinyl chloride include potassium metabisulfite (N. Fischer and C. Lambling, French Pat. No. 2,086,635 (1972), sodium bisulfite (H. Minato, K. Hashimoto, and T. Yasui, Japan. Pat. No. 6,8 20,300 (1968), sodium bisulfite-cupric chloride (B. K. Shen, U.S. Pat. No. 3,668,194 (1972), sodium dithionite-ferrous sulfate (H. Minato, Japan. Pat. No. 70 04, 994 (1970) and trialkyl boron (R. Kato and I. Soematsu, Japan. Pat. No. 5498('65) (1965); A. V. Ryabov, V. A. Dodonov, and Y. A. Ivanova, Tr. Khim. Khim. Tekknol., 1970, 238; Stockholms Superfosfat Fabriks A/B, Brit. Pat. No. 961,254 (1964).

Reducing agents used in conjunction with monomer-soluble diacyl peroxides in the polymerization of vinyl chloride include ferrous sulfate-sodium hydroxide (A. M. Sharetskii, S. V. Svetozarskii, E. N. Zil'berman, and I. B. Kotlyar, Brit. Pat. No. 1,164,250 (1969) and U.S. Pat. No. 3,594,359 (1971), ferrous caproate (J. Ulbricht and N. V. Thanh, Plaste Kaut., 21, 186 (1974); J. Ulbricht and G. Mueller, Plaste Kaut., 21, 410 (1974) and trialkyl boron (A. V. Ryabov, V. A. Dodonov, and Y. A. Ivanova, Tr. Khim. Khim. Tekknol., 1970, 238).

The water-soluble reducing agents are more suitable for emulsion than for bulk or suspension polymerization, the presence of iron compounds is detrimental to the properties of poly(vinyl chloride) and the trialkyl borons react with oxygen and require special handling.

SUMMARY OF THE INVENTION

An object of the present invention is to provide a process for the polymerization of ethylenically unsaturated monomers, particularly vinyl chloride, in the presence of peroxygen compounds at temperatures at which the latter are stable and readily handled. Another object of the present invention is to provide a process for the bulk or suspension polymerization of vinyl chloride at temperatures below 70° C. using peroxygen compounds which, at these temperatures, do not generate free radicals at a sufficient rate to initiate polymerization at a practical rate, if at all.

It has now been found that this improvement in unsaturated monomer, particularly vinyl chloride, polymerization can be achieved by utilizing a redox catalyst system consisting of a peroxyester or a diacyl peroxide and a stannous or antimony (III) mercaptide.

DETAILED DESCRIPTION OF THE INVENTION

According to the present invention, the polymerization of ethylenically unsaturated monomers, particularly vinyl chloride, is carried out in bulk or suspension, under the conditions applicable thereto and well known to those skilled in the art, using a catalyst system consisting of a monomer-soluble peroxyester or diacyl peroxide and a reducing agent which is a stannous or antimony (III) mercaptide.

The half-life of a free radical catalyst is the time required for 50% decomposition at a particular temperature. The half-life is only relevant as regards the temperature at which it is desired to conduct a polymerization, e.g. the polymerization of vinyl chloride below 70° C. to produce poly(vinyl chloride) with greater thermal stability than polymer produced above 70° C. The half-life of a peroxyester refers to thermal decomposition and, consequently, if a polymerization is to be conducted at 50° C., a catalyst with a half-life of 20 hours or less at 50° C., can be used for the polymerization, e.g. t-butyl peroxypivalate or t-butyl peroxyneodecanoate, as is well known to those skilled in the art.

However, if it is desired to conduct the polymerization with a catalyst which does not require refrigerated shipment and/or storage, which are required by t-butyl peroxypivalate and t-butyl peroxyneodecanoate, than in accordance with the present invention, a catalyst with a half-life of more than 50 hours at 50° C. can be used in the presence of a suitable reducing agent, e.g. t-butyl peroxyoctoate which has a half-life of 133 hours at 50° C. in the absence of the reducing agent may be used.

Alternatively, if it is desired to conduct polymerization at or below 25° C., in order to maintain better control of the reaction exotherm or to obtain a higher molecular weight, less branched polymer, the aforementioned peresters, despite the requirement for refrigerated shipping and storage, having half-lives of more than 150 hours at 25° C., may be used in the presence of a suitable reducing agent.

The process of the present invention utilizes a peroxygen compound such as a peroxyester and a diacyl peroxide, in the presence of a suitable reducing agent, at a temperature where the peroxygen compound has a half-life of more than 50 hours in the absence of the reducing agent.

The peroxyesters which may be used in the process of the present invention are the alkyl and aralkyl peroxyesters of aliphatic or aromatic carboxylic acids or carbonic acid and may be represented by the structural formula

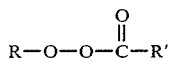

where R is an alkyl, aralkyl or alkoxycarbonyl group, R' is an alkyl, aralkyl, aryl or alkoxy group, and R and R' are the same or different. When R and/or R' contain alkyl or aralkyl moieties, the latter may contain 1-20 carbon atoms and may be primary, secondary or tertiary, linear or branched, acyclic or cyclic, saturated or unsaturated and may contain non-hydrocarbon substituents including halogen and hydroxyl groups. When R' is an aromatic moiety, it may be unsubstituted or may contain hydrocarbon, halogen and/or other substituents.

The peroxyesters may be monoperoxyesters or the diperoxyesters of dicarboxylic acids or diols.

Representative peroxyesters include t-butyl peroxyacetate, t-butyl peroxyisobutyrate, t-butyl peroxypivalate, t-butyl peroxyneodecanoate, t-butyl peroxybenzoate, t-butyl peroxyoctoate, t-butyl peroxy(2-ethylhexanoate), t-amyl peroxyneodecanoate, cumyl neodecanoate, isobutyl peroxypivalate, sec-butyl peroxybenzoate, n-butyl peroxyoctoate, t-butyl peroxy-3,3,5-trimethylhexanoate, t-butyl peroxy-2-methylbenzoate, 2,5-dimethyl-2,5-bis(2-ethylhexanoylperoxy)hexane, 2,5-dimethyl-2,5-bis(benzoylperoxy)hexane, 2,5-dimethyl-2,5-bis(octanoylperoxy)-hexane, di-t-butyl diperoxyphthalate, t-butyl peroxymaleic acid, t-butyl peroxyisopropylcarbonate, di(sec-butyl) peroxydicarbonate, bis(4-t-butylcyclohexyl)peroxydicarbonate, diisopropyl peroxydicarbonate, di(n-propyl)peroxydicarbonate, di(2-ethylhexyl)peroxydicarbonate, dicyclohexyl peroxydicarbonate, dicetyl peroxydicarbonate and the like.

Aliphatic diacyl peroxides including acetyl peroxide, lauroyl peroxide, decanoyl peroxide and isononanoyl peroxide, as well as aromatic diacyl peroxides including benzoyl peroxide, p-chlorobenzoyl peroxide and 2,4-dichlorobenzoyl peroxide may be used in conjunction with the reductants of the present invention at a temperature where the diacyl peroxide has a half-life of more than 50 hours in the absence of the reductant.

The process of the present invention is carried out with a redox catalyst system consisting of a monomer-soluble peroxygen compound and a reductant. In bulk polymerization, a monomer-soluble reductant is required, while suspension polymerization permits the use of either a monomer-soluble or a monomer-insoluble reductant.

The stannous and antimony (III) mercaptides which may be reductants in the practice of the present invention include the stannous and antimony (III) derivatives of aliphatic and aromatic mercaptans where the alkyl group in the aliphatic mercaptan or the alkyl substituent, if any, on the aromatic mercaptan, contains 1-24 carbon atoms and may be branched or linear, cyclic or acyclic. The stannous and antimony (III) mercaptides may also be derived from a thio- or mercaptoalkyl carboxylic acid ester, where the alkyl segment of the alkylcarboxylic acid or the alkyl group in the ester contains 1-24 carbon atoms and may be branched or linear, cyclic or acyclic.

Representative stannous bis(alkyl mercaptides) and antimony tris(alkyl mercaptides) are derived from n-butyl mercaptan, sec-butyl mercaptan, t-butyl mercaptan, amyl mercaptan, isoamyl mercaptan, t-amyl mercaptan, hexyl mercaptan, ethylhexyl mercaptan, n-dodecyl mercaptan, t-dodecyl mercaptan, octadecyl mercaptan and the like.

Representative stannous bis(alkyl thioalkanoates) and antimony tris(alkyl thioalkanoates) are derived from methyl mercaptoacetate, isooctyl thioglycolate, butyl thiopropionate, t-butyl thiobutyrate, t-dodecyl thiolaurate and the like.

The peroxygen compound/reductant mole ratio is generally 1/0.01-2, with a preferred mole ratio of 1/0.1-1.

The concentration of peroxygen compound is generally 0.01-5% by weight of the vinyl halide, i.e. vinylidene chloride or vinyl chloride, with a preferred concentration of 0.05-1% by weight. However, the concentrations of both peroxygen compound and reductant may be reduced by the addition of complexing agents which contain suitable functional groups. Alternatively, the addition of complexing agents increases the rate of polymerization at a given concentration of peroxygen compound and reductant.

The rate of decomposition of a peroxygen compound such as t-butyl peroxyoctoate in the presence of a stannous or antimony (III) mercaptide is decreased in the presence of vinyl chloride, presumably due to the formation of a complex between the reductant and the monomer. However, when a complexing agent containing carbonyl functionality, e.g. a ketone, lactone, carboxylic acid or carboxylic ester, is present, the complex formation is decreased and the rate and extent of decomposition of the peroxygen compound increases, even in the presence of the monomer. The increased rate and extent of decomposition of a peroxyester or diaxyl peroxide in the presence of the complexing agent is accompanied by an increase in the rate and extent of polymerization of vinyl chloride.

The complexing agents which may be used in the process of the present invention are organo-soluble and contain carbonyl groups or phosphorous-oxygen linkages. Thus, ketones, carboxylic acids and esters and phosphate esters are effective complexing agents. The latter may be saturated or unsaturated, cyclic or acyclic, branched or linear, substituted or unsubstituted.

Representative ketones include 2-butanone, 2-pentanone, 3-pentanone, 4-hexanone, 4-methyl-2-pentanone, 2,4-dimethyl-3-pentanone, 4-heptanone, 2-nonanone, 6-undecanone, 9-heptadecanone, 2-decanone, diacetone alcohol, cyclopentanone, cyclohexanone, cycloheptanone, acetophenone, propiophenone and the like.

Representative carboxylic acids include propionic, butyric, isobutyric, valeric, isovaleric, caproic, enanthic, caprylic, capric, 2-ethylhexanoic, pelargonic, lauric, adipic, pimelic, suberic, benzoic, chloroacetic, phthalic and the like.

Representative esters include dioctyl phthalate, dibutyl phthalate, dioctyl adipate, di-2-ethylhexyl sebacate, dioctyl azelate, dibutyl pelargonate and the like. The compounds which are normally used as plasticizers for poly(vinyl chloride) are particularly useful in the practice of the process of the present invention. Representative monomeric and polymeric plasticizers are described in Encyclopedia of Polymer Science and Technology, 10, 247–259 (1969), the disclosure of which is incorporated herein by reference. Phosphate esters including those used as plasticizers and containing P-O linkages, e.g. triethyl phosphate, tricresyl phosphate, etc., are also effective as complexing agents in the practice of this invention.

The stannous or antimony (III) mercaptide/complexing agent mole ratio may be 1/0.1–4 and the preferred range is 1/0.5–2.

The procedures normally used in the bulk and suspension polymerization of vinyl chloride are applicable to the process of the present invention. Typical procedures are described in Encyclopedia of Polymer Science and Technology, 14, 339–343 (1971), the disclosure of which is incorporated herein by reference.

The polymerization may be conducted at or above atmospheric pressure. In the usual procedure, the reactor is charged at atmospheric pressure and the pressure rises when the contents of the reactor are brought to reaction temperature. The pressure may increase further due to the reaction exotherm and then remain constant until the conversion reaches about 70%, after which it decreases rapidly as the reaction continues.

The polymerization temperature may range from $-50°$ to $+70°$ C. for bulk polymerization, although temperatures of 40° to 60° C. are preferred. Suspension polymerization may be carried out at temperatures of $+5°$ to $+70°$ C., although preferred temperatures are in the 20°–60° C. range.

The concentrations of monomer and water, e.g. about 2/1 weight ratio, and the types and concentrations of suspending agents are those normally used in suspension polymerization and are well known to those skilled in the art. Typical suspending agents include poly(vinyl alcohol), partially saponified poly(vinyl acetate), gelatin, methylcellulose, vinyl acetate-maleic anhydride copolymer and the like. Various emulsifiers such as sulfonated oils and ethylene oxide condensation products may be added to control surface tension and particle shape. Buffers may be used, where necessary, e.g. when gelatin is used as suspending agent. Chain transfer agents such as chlorinated hydrocarbons and isobutylene may be used in the preparation of low molecular weight polymer.

Although the peroxygen compound-reductant catalyst system of the present invention is particularly useful in the bulk and suspension polymerization of vinyl chloride and vinylidene chloride, the redox system per se or in the presence of a complexing agent, may also be used in the copolymerization of vinyl chloride with vinylidene chloride, vinyl acetate and other monomers which undergo copolymerization with vinyl chloride, as well as in the copolymerization of vinylidene chloride with monomers which normally copolymerize therewith in the presence of free radicals.

The following examples are illustrative embodiments of the practice of the present invention and are not to be construed as limitations on the invention or the claims. Numerous modifications will be obvious to those skilled in the art.

EXAMPLE I

Stannous bis(t-dodecyl mercaptide) (SnDM) was prepared by the reaction of stannous chloride and t-dodecyl mercaptan in the presence of sodium carbonate, in refluxing toluene.

Three pressure bottles were charged with 24.2 g (250 mmoles) vinylidene chloride and 0.054 g (0.25 mmole) t-butyl peroxyoctoate (0.24% by weight of monomer). SnDM was added to each bottle which was then capped and shaken in a 50° C. constant temperature bath for 3 hours. The bottles were opened and the polymer isolated by filtration. The conversions are shown in the following table:

| No. | SnDM, mmole | tBPO/SnDM mole ratio | Conversion, % |
|-----|-------------|----------------------|---------------|
| 1   | 0           | 1/0                  | 0.7           |
| 2   | 0.0027      | 1/0.011              | 12.4          |
| 3   | 0.0096      | 1/0.038              | 19.8          |

EXAMPLE II

A. A mixture of 20 g (206 mmoles) vinylidene chloride, 0.58 ml (2 mmoles) t-butyl peroxypivalate and 0.5 ml (1 mmole) SnDM was allowed to stand at 25° C. for 4 hours. The slurry of polymer in monomer was diluted with kerosene and analyzed for peroxyester content. No residual peroxyester was detected in the reaction mixture.

B. A glass bottle was charged with 24 g (247 mmoles) vinylidene chloride, 0.4 ml (1.37 mmoles) t-butyl peroxypivalate (1% by weight of monomer) and 0.34 ml (0.68 mmole) SnDM. After 5 hours at 25° C., the bottle was opened and 23 g (98% conversion) poly(vinylidene chloride) was isolated.

EXAMPLE III

A. A mixture of 10.4 g (168 mmoles) vinyl chloride, 0.58 ml (2 mmoles) t-butyl peroxypivalate and 0.5 ml (1 mmole) SnDM was allowed to stand at 25° C. for 4 hours. The monomer was released and the residue was diluted with kerosene and analyzed for peroxyester content. Analysis showed the presence of 95% of the initially charged peroxyester.

B. The same mixture as in A was allowed to stand at 25° C. for 3 hours, the monomer was released and the residue was dissolved in kerosene. After 4 hours at 25° C., the mixture was analyzed and found to contain 85% of the initially charged peroxyester.

C. A bottle was charged with 8.7 g vinyl chloride and then capped with a screw cap with a self-sealing gasket. After 0.14 ml (0.5 mmole) t-butyl peroxypivalate (1% by weight of vinyl chloride) and 0.124 ml (0.25 mmole) SnDM were injected into the bottle by hypodermic syringe, the mixture was allowed to stand at 25° C. for 48 hours. The bottle was vented and 0.27 g (3% conversion) polymer was isolated.

D. The procedure in C was repeated with the same reactants, except that 0.023 ml (0.24 mmoles) ethyl acetate was included in the charge. After 48 hours at 25° C. the yield of polymer was 2.0 g (23.5% conversion).

EXAMPLE IV

A. A solution containing 1 ml (2 mmoles) t-butyl peroxyoctoate (tBPO) in kerosene was mixed with either 0.5 ml (1 mmole) or 1.0 ml (2 mmoles) SnDM and allowed to stand at 50° C. for 4 hours. Analysis for peroxyester content, by iodometric titration after treatment with excess stannous chloride, gave the results shown in the following table:

| No. | tBPO/SnDM mole ratio | Residual tBPO, % |
|---|---|---|
| 1 | 1/0.5 | 58.5 |
| 2 | 1/1 | 17 |

B. The procedure in Example III-C was repeated with 11.5 g (184 mmoles) vinyl chloride, 0.13 ml (0.53 mmole) t-butyl peroxyoctoate and 0.1 ml (0.265 mmole) SnDM. After 5 hours at 50° C., 4 g (35% conversion) of polymer was isolated.

C. The procedure in B was repeated except that SnDM was omitted. No polymer was isolated after 5 hours at 50° C.

EXAMPLE V

A 4 oz glass bottle was charged with the following suspension recipe:
21 ml distilled water (boiled)
1 ml 1% aqueous solution of Tween 60 (polyoxethylene sorbitan monostearate, Atlas Chemical Industries Inc.)
1 ml 1% aqueous solution of Span 60 (sorbitan monostearate, Atlas Chemical Industries Inc.)
2 ml 1% aqueous solution of Methocel A-15 (methylcellulose with viscosity of 15 cps as a 2% aqueous solution, Dow Chemical Co.)
Nitrogen was bubbled through the aqueous solution for 15 minutes.

Gaseous vinyl chloride was purified by passage through two 5% aqueous sodium hydroxide solutions, dried by passage through a silica gel column and then condensed with the aid of a dry ice bath. After 10 g liquid vinyl chloride and 0.12 g (0.23 mmole) SnDM were added to the suspension recipe, the bottle was closed with a screw cap containing a center hole and a self-sealing gasket. The addition of 0.055 ml (0.23 mmole) t-butyl peroxyoctoate (0.5% by weight of vinyl chloride) was made by injection through the gasket using a hypodermic syringe. The bottle was placed in a 50° C. constant temperature bath and shaken for 20 hours. The bottle was removed from the bath and the residual monomer was released. The yield of poly(vinyl chloride) was 3.1 g (31% conversion).

EXAMPLE VI

Two glass bottles were charged with 10.6 g liquid vinyl chloride and then capped. After 0.054 ml (0.23 mmole) t-butyl peroxyoctoate (0.5% by weight of vinyl chloride) and 0.15 ml (0.11 mmole) antimony tris(isooctyl thioglycolate) were injected in that order through the self-sealing gasket, the bottles were shaken at 50 C. in a constant temperature bath. One bottle was removed after 7 hours and the second bottle was removed after 22 hours. The residual monomer was released from each bottle and the polymer isolated. The conversion was 20.5% after 7 hours and 30% after 22 hours at 50° C.

While particular embodiments of this invention have been disclosed above, it will be understood that the invention is obviously subject to variation and modification without departing from its broader aspects.

What is claimed is:

1. A process for the preparation of polymers and copolymers of a vinyl halide, which consists in polymerization in bulk or suspension, in the presence of a redox catalyst system consisting of a peroxygen compound selected from the class consisting of peroxyesters and diacyl peroxides, and a reducing agent selected from the class consisting of stannous and antimony (III) mercaptides.

2. The process of claim 1 wherein the vinyl halide is selected from the class consisting of vinyl chloride and vinylidene chloride.

3. The process of claim 1 wherein the polymerization is carried out at a temperature where the peroxygen compound has a half-life of more than 50 hours in the absence of the reducing agent.

4. The process of claim 3 wherein said polymerization temperature is in the range from −50° to +70° C.

5. The process of claim 3 wherein said polymerization temperature is between 20° and 60° C.

6. The process of claim 1 wherein said peroxyester is selected from the class consisting of alkyl peroxyesters of aliphatic carboxylic acids, aromatic carboxylic acids and carbonic acid.

7. The process of claim 1 wherein said reducing agent is the stannous or antimony (III) mercaptide derived from an aliphatic mercaptan, an aromatic mercaptan or a thioalkyl carboxylic ester.

8. The process of claim 7 wherein said stannous mercaptide is stannous bis t-dodecyl mercaptide).

9. The process of claim 7 wherein said antimony (III) mercaptide is antimony tris(isooctyl thioglycolate).

10. The process of claim 6 wherein said peroxyester is t-butyl peroxyoctoate.

11. The process of claim 6 wherein said peroxyester is t-butyl peroxypivalate.

12. The process of claim 1 wherein said diacyl peroxide is selected from the class consisting of lauroyl peroxide and benzoyl peroxide.

13. A process for the preparation of polymers and copolymers of vinyl chloride, which consists in polymerization in bulk or suspension, in the presence of a redox catalyst system consisting of a peroxygen compound selected from the class consisting of peroxyesters and diacyl peroxides, a reducing agent selected from the class consisting of stannous and antimony (III) mercaptides, and a complexing agent.

14. The process of claim 13 wherein said complexing agent is selected from the class consisting of ketones, lactones, carboxylic acids, carboxylic esters and compounds containing a phosphorous-oxygen linkage.

15. The process of claim 13 wherein said complexing agent is a plasticizer for poly(vinyl chloride).

* * * * *